United States Patent [19]

Schwab et al.

[11] Patent Number: 5,451,419
[45] Date of Patent: Sep. 19, 1995

[54] DRIED FOOD FOAM PRODUCTS

[75] Inventors: Edward C. Schwab, New Brighton; Kristin L. Thomas, Rosemount; George E. Brown, Edina; Terry R. Harrington, Albertville, all of Minn.

[73] Assignee: General Mills, Inc., Minneapolis, Minn.

[21] Appl. No.: 252,475

[22] Filed: Jun. 1, 1994

Related U.S. Application Data

[63] Continuation of Ser. No. 60,782, May 12, 1993, Pat. No. 5,342,635.

[51] Int. Cl.$^6$ .................................. A23L 1/00
[52] U.S. Cl. ...................... 426/564; 426/572; 426/639; 426/640
[58] Field of Search ............... 426/564, 565, 567, 572, 426/616, 639, 640

[56] References Cited

U.S. PATENT DOCUMENTS

| | | | |
|---|---|---|---|
| 3,682,651 | 8/1972 | McAlister | 426/242 |
| 3,904,429 | 9/1975 | Eastman et al. | 426/242 |
| 3,908,029 | 9/1975 | Fredrickson | 426/242 |
| 4,251,551 | 2/1981 | Van Hulle et al. | 426/242 |
| 4,251,561 | 2/1981 | Gajewski | 426/660 |
| 4,335,155 | 6/1982 | Blake et al. | 426/565 |
| 4,342,788 | 8/1982 | Clatfelter | 426/243 |
| 4,368,211 | 1/1983 | Blake et al. | 426/564 |
| 4,409,250 | 10/1983 | Van Hulle et al. | 426/242 |
| 4,515,822 | 5/1985 | Kraig et al. | 426/445 |
| 4,608,261 | 8/1986 | MacKenzie | 426/242 |
| 4,800,090 | 1/1989 | August | 426/243 |
| 4,803,090 | 2/1989 | Schlipalius et al. | 426/242 |
| 4,965,081 | 10/1990 | Lazarus | 426/242 |
| 5,126,160 | 6/1992 | Giddey et al. | 426/564 |
| 5,135,122 | 8/1992 | Gross et al. | 219/10.55 A |
| 5,200,222 | 4/1993 | Schwab et al. | 426/242 |
| 5,202,139 | 4/1993 | Gaon et al. | 426/242 |

FOREIGN PATENT DOCUMENTS

| | | |
|---|---|---|
| 0072878 | 3/1983 | European Pat. Off. |
| 0312363 | 4/1989 | European Pat. Off. |
| 0375006 | 6/1990 | European Pat. Off. |
| 2458226 | 2/1981 | France. |
| 2055285 | 3/1981 | United Kingdom. |
| 2193619 | 2/1988 | United Kingdom. |

Primary Examiner—George Yeung
Attorney, Agent, or Firm—John A. O'Toole; L. MeRoy Lillehaugen

[57] ABSTRACT

A dried food foam product comprising: (A) about 5% to 70% by weight (dry basis) of the foam product of a flavor characterizing ingredient; (B) sufficient amounts of an undenatured proteinaceous whipping agent sufficient to provide the foam product to a density of 0.1 to 0.6 g/cc (dry weight basis) having a heat setting temperature; (C) about 0% to 55% by weight (dry basis) of the product of a nutritive carbohydrate sweetening agent; and (D) about 0.5% to 7% by weight moisture.

9 Claims, No Drawings

DRIED FOOD FOAM PRODUCTS

This is a continuation of application Ser. No. 08/060,782, filed May 12, 1993, now U.S. Pat. No. 5,342,635.

1. Field of the Invention

The present invention relates to food products and to methods for their preparation. More particularly, the present invention relates to high intensity microwave heating of edible foams with subsequent drying to produce finished products particularly suitable for use in blends with R-T-E cereal pieces.

2. Background

Ready-To-Eat ("R-T-E") breakfast cereals are popular packaged food items. R-T-E cereals exist in large numbers of varieties including puffed and unpuffed, regular or presweetened, and including a wide variety of cereal compositions. The art is replete with various R-T-E cereal products that vary in shape, composition, texture, density, etc.

One popular category of R-T-E cereals comprises an R-T-E cereal base in combination with one or more additional ingredients. For example, flaked R-T-E cereals (e.g., bran flakes) are frequently mixed with raisins. Other blended R-T-E cereal products include mixtures of a puffed oat-based R-T-E cereal pieces with dried marshmallow-like pieces called "marbits." In still another example, a popular R-T-E cereal comprises a flaked R-T-E cereal together with a "nut cluster" which is a piece comprising nuts, starchy material, sugar, etc. Such combinations of an R-T-E cereal base together with the added ingredient(s) provide pleasing variety to R-T-E cereal products.

Notwithstanding the popularity of such blended R-T-E cereal products, such additives must possess a variety of attributes which collectively determine suitability for use as an added ingredient into such R-T-E cereal blends. One of the more important of these attributes is the feature of water activity. When added ingredients have water activities higher than the cereal base, moisture, upon storage migrates from the added ingredient to the cereal blend pieces seeking equilibration. As the cereal base pieces pick up moisture, the product quality deteriorates, exhibiting loss in crispness.

Still another attribute desirable in an R-T-E cereal piece is resistance to softening upon the addition of milk. Such resistance to the development of sogginess is referred to in the R-T-E cereal art as "bowl life." While bowl lives as long as possible are desirable, it is particularly desirable to have an added ingredient having a bowl life of at least two minutes.

Still another desirable attribute for an added ingredient in R-T-E cereals is to have a high flavor impact. Generally, added ingredients are used in smaller proportions compared to the larger proportions of the R-T-E cereal base. Accordingly, it is desirable to have a strong flavor in the added ingredients.

Applicants have surprisingly discovered that improved, edible foam products can be prepared using high intensity microwave heating to set a wet foam prior to subsequent dehydration. High intensity microwave heating to heat set the edible foam surprisingly results in a very rapid heat setting step that minimizes heat related flavor degradation. Additionally, the short heating step minimizes losses in foam volume that sometimes can occur due to foam cell collapse upon extended heating. The finished edible foam products herein find particular suitability for use as added ingredients to R-T-E cereals.

SUMMARY OF THE INVENTION

In its method aspect, the present invention resides in methods of preparing edible foam products. The present methods essentially comprise: A) providing a wet, edible foam having a heat settable ingredient; B) high intensity microwave heating the wet, edible foam to heat set the heat settable structuring ingredient at atmospheric pressure; and C) finish drying the heat set edible foam to desired final moisture content.

In its product aspect, the present invention resides in dried, heat set edible foam products that are particularly suitable for use as added ingredients to R-T-E cereals. The finished products are characterized by low moisture content and low density. The foam products are highly homogeneous (i.e., substantially free of interior voids).

The products are characterized by a density ranging from about 0.1 to 0.6 g/cc. The moisture content is about 1% to 6%.

The products essentially comprise 1) about 5% to 50% of a flavor characterizing ingredient, 2) about 1.5% to 5% of a heat set foam structure ingredient, and 3) about 0% to 35% of a nutritive carbohydrate sweetening agent.

DETAILED DESCRIPTION OF THE INVENTION

The present invention provides improved edible foam products and high intensity microwave methods for their preparation. The present methods involve subjecting a wet, edible foam containing a heat settable structuring ingredient to a brief exposure to a high intensity microwave field. The methods of the present invention, as well as product use, are described in detail below.

Throughout the specification and claims, percentages are by weight and temperatures in degrees Fahrenheit, unless otherwise indicated.

A. Providing A Wet Edible Food Foam.

In the first essential step of the present method, a wet homogeneous, edible foam is provided. Of course, the art is replete with suitable compositions useful in the formulation of an edible foam product. Generally, however, useful edible foam materials herein essentially comprise 1) a flavor characterizing ingredient, 2) a heat settable foam structure ingredient, or a heat settable whipping agent, and 3) edible nutritive carbohydrate sweetening agents. Preferred edible foam compositions additionally include a starchy ingredient. Suitable edible foam products can comprise:

| Ingredient | Weight % | Preferred Weight % |
|---|---|---|
| Flavor characterizing ingredient | 5 to 45 | 8 to 30 |
| Heat settable foam structure ingredient | 1 to 10 | 2 to 8 |
| Edible nutritive carbohydrate sweetening agent | 0 to 40 | 1 to 40 |

1. Flavor Characterizing Agent

The flavor characterizing ingredient can vary widely. Preferred flavor characterizing ingredients are selected from the group consisting of fruit solids, chocolate, peanut butter, dried milk components, and mixtures thereof. Especially useful herein are fruit puree concentrates which not only supply the fruit material (dry weight basis) but also moisture which is helpful in forming the wet foam.

Surprisingly, puree(s) made from any fruit can be used herein. Examples of such fruits include pineapple, lemon, orange, peach, pear, grape, mango, apple, tomato, banana, plum, blueberry, raspberry, strawberry, blackberry, current, cherry, and mixtures thereof. Preferred fruits are selected from the group consisting of strawberry, cherry, blueberry, raspberry, and mixtures thereof. Fresh fruit is, of course, highly preferred for preparing puree(s) for use herein. However, previously frozen fruit is also suitable for use herein.

Fruit puree(s) as defined herein, of course, are well known and the skilled artisan will have no problem preparing puree(s) from suitable fruit(s). Generally, fruit puree(s) are prepared by simply comminuting whole fruit in known equipment. For those fruits containing small seeds, e.g., grapes, strawberries, blackberries, as opposed to peaches, plums or apples, a post-comminuting deseeding step may be necessary to provide the desirable seedless fruit puree's useful herein. Typically, either manual or mechanical deseeding involves screening the comminuted fruit to separate the seeds from the fruit puree.

Another highly preferred optional component is the natural chocolate flavorant of cocoa. Also useful herein is cocoa and chocolate. Cocoa can have a significant fat component. High fat cocoa has at least 22% by weight cocoa fat. Conventional cocoa contains between 10% and 22% cocoa fat.

Useful ingredients include milk products, components and milk product and component solids. For example, yogurt can be used as the primary flavor ingredient. Also, non-fat dry milk solids, cream, cream solids and other milk products can be used.

2. Heat Settable Foam Structure Ingredient

The present compositions also comprise ingredients that initially form a food foam and which can be heat set to form a foam structuring agent. Particularly suitable for use as the foam forming and structure ingredient are undenatured proteinaceous whipping agents. These protein based whipping agents are used in sufficient quantities to provide a finished foam density of about 0.1 to 0.6 g/cc in the finished product. Generally, good results are obtained when the composition comprises from about 1.5% to 10% of the whipping agent. Better results are obtained when the whipping agent comprises from about 2% to 8% by weight of the present compositions. Best results are obtained when the whipping agent is present at about 6%. The whipping agent acts as a structuring agent allowing the incorporation of air or other gas into the present crystalline material.

Whipping agents useful in the present compositions are those commonly used in food products, particularly in aerated confections. Such whipping agents are well known in the food art, and selection of suitable materials for use herein will pose no problems to the skilled artisan. Preferred whipping agents are selected from the group consisting of protein hydrolyzates, dried egg whites and mixtures thereof.

Preferred for use herein as the heat setting ingredient is dried egg white solids. While liquid egg whites can be used in substitution on equivalent solids basis for the preferred dried egg white solids, liquid egg whites pose extra sanitation difficulties. Dried egg whites or egg albumen is especially preferred for use herein since higher volume (i.e., lower density) puffed finished foam products can be realized. Of course, the dried egg white solids should be undenatured prior to being heat set according to the methods of the present invention.

Other suitable whipping agent materials can be derived as protein hydrolyzates from, for example, caseinate, whey (see, for example, U.S. Pat. No. 4,089,987 issued May 16, 1978 to P. K. Chang and incorporated herein by reference), and various vegetable proteins. The soy protein hydrolyzates disclosed in U.S. Pat. No. 3,814,816 (issued Jun. 4, 1974 to R. C. Gunther, incorporated herein by reference) are particularly effective whipping proteins and are useful as the present whipping agents. These proteins are commercially available from Staley Manufacturing Co., Decatur, Ill., and are prepared by initially chemically hydrolyzing the soy protein to a prescribed viscosity range and, thereafter, enzymatically hydrolyzing the soy protein with pepsin to produce a pepsin modified hydrolyzed soy protein whipping agent. Foam confections herein of various desired densities can readily be realized by manipulating the protein hydrolyzate levels in a manner analogous to when egg whites are employed as the whipping agent.

If desired, the foams can also additionally comprise foaming emulsifiers as supplemental foaming agents. Such foaming emulsifiers are well known in the art. Especially useful herein as a supplemental foaming agent is triglycerol monostearate. If used, the supplemental foaming emulsifier can comprise about 0.1% to about 2% of the finished product, preferably about 0.5% to 1.5%. Employment of such supplemental foaming agents can reduce the cost of the present products.

3. Sweetening Agent

A nutritive carbohydrate sweetening agent is an essential component herein and is present in the present food compositions at from about 0% to 35%, preferably about 1% to 35%, and more preferably 10% to 25%. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate and the like. Additionally, the present carbohydrate sweetening agents are to be distinguished from such protein-based sweetening agents as aspartame, thaumatin and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, dextrose, fructose, corn syrup solids and honey. Highly preferred nutritive carbohydrate sweetening agents are those selected from the group consisting of sucrose, corn syrup solids and dextrose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder or (apple powder as it is commercially labeled) which is approximately 70% by weight (dry basis) sugars can be employed as nutritive sweetening agent. If used, such impure sources of sugars are employed at levels based upon their total sugars content. Up to 25% of the nutritive carbohydrate sweetening agent used herein can be supplied by such impure sweetening agents.

Optionally, the edible foam can include a starchy component. Useful herein are wide varieties of starchy materials including starches, whether or not pregelatinized, dextrins and flours. The starchy material is employed primarily as a filler ingredient. However, selection of particular starchy materials and ingredient concentrations thereof can have an influence on one or more end product attributes. For example, when it is desirable to have an edible foam product exhibiting a greater degree of "melt in the mouth" attribute, the edible foam can include a greater amount of dextrins (e.g., malto dextrins) and lesser quantities of flour materials. Pure starches and dextrinized starches are preferred for use herein although cereal flours can also be used. The present invention can comprise about 1% to 45%, preferably about 5% to 40% and most preferably about 6% to 30% of a starchy material.

The present confections can optionally contain a variety of additional ingredients suitable for rendering such food products more organoleptically or aesthetically desirable. Such optional components include, for example, flavors, dyes, coloring agents, vitamins, preservatives and the like. If present, such minor optional components should comprise from about 0.1% to 1.5%. In selecting such ingredients, preferably only small amounts of hydrophobic material should be used.

The present wet foams comprise sufficient amounts of water to form the present highly aerated foams. Of course, since the moisture is to be removed by subsequent finish drying, it is preferred to minimize the amount of moisture used in preparing the wet foam. Generally, good results are obtained when the moisture content ranges from about 20% to 45% and preferably about 20% to 30%.

The wet blend of ingredients is then aerated by any suitable means to provide a gas-containing aerated foam having a specific gravity of between about 0.2 and 1.0, i.e., a density of between about 0.2 g/cc and 1.0 g/cc at atmospheric pressure. Aeration of the foam can be accomplished by injecting gas under pressure into the wet blend and concurrently whipping the wet blend. The gas injected into the wet blend must be non-toxic, relatively inert in the presence of the ingredients of the wet blend and substantially insoluble in the wet blend. Such gases include, for example, air, nitrogen and carbon dioxide. Aeration can also be accomplished by simple whipping to incorporate air at atmospheric pressures. Air is the preferred gas for aeration.

Aeration is well known to the food art, e.g., for marshmallows and any of the well-known aeration method and techniques are suitable in the present method of preparation so long as such techniques provide the desired density decrease in the confection melt. For this step in the present process, employment of an Oakes type continuous marshmallow mixer and beater or "whipper" is preferred. A full description of such whipping apparatus and techniques of its use is found in U.S. Pat. No. 2,600,569 (issued Jun. 17, 1952 to Earl T. Oakes) which is incorporated herein by reference. The use and operation of the Oakes-type mixer is well known in the marshmallow industry.

In a preferred method of aeration, the wet blend is generally fed into the whipper at a feed temperature of from about 70° F. to 180° F. (21° to 82° C.). Compressed air is fed to the whipper at modest pressures, i.e., from about 10 to 150 psig and at room temperatures. The whipper's rotor can operate at between 100 to 500 rpm.

The wet blend while being aerated is optionally simultaneously cooled to maintain a temperature of 70° F. to 160° F. upon exiting the Oakes whipper. The cooling can be accomplished in part by the incorporation of the room temperature (or cooler) gas. Most of the heat transfer can be accomplished by providing the Oakes whipper with cold water jacket. Larger whipping machines can also be equipped with cooling coils.

The extent to which the present aerated confections incorporate air (or other inert gas) can be expressed by the density or the specific gravity of the present compositions. Thus, the specific gravity of the present compositions ranges from about 0.1 to 0.7, preferably about 0.1 to 0.5 and for best results about 0.15 to 0.35.

The extent of aeration and thus the specific gravity is dependent in part upon the quality and quantities of whipping agents employed as discussed above. For a given composition, particular specific gravities are obtained by controlling air incorporation in known manner as described more fully below.

B. Exposing the Edible Foam To A High Intensity Microwave Field To Form A Heat Set Foam.

The present methods essentially comprise the step of subjecting the wet edible foam to a high intensity microwave field.

The exposure of the edible foam to the high intensity microwave field is continued for sufficient time to raise the temperature to above the heat setting temperature of the heat setting ingredient, i.e., to denature the undenatured proteinaceous whipping agent or foam structuring agent. Generally and preferably, the heating is continued to obtain a temperature of >200° F. Once the heat setting temperature is reached, the heating is discontinued.

Surprisingly, the intense microwave heating treatment gives a unique heat set to the foam, and high volume (i.e., low densities) quality to the product. In part, this effect is surprising because when comparable edible foam pieces are subjected to lower intensity microwave fields such as are characteristic of consumer microwave ovens, the moisture is merely driven off and the foam tends to collapse. Edible foam pieces even when microwave heated in low quantities at low field strengths characteristic of consumer microwave ovens for extended times merely result in finished products undesirably exhibiting hardness and/or charring without the flavor and stability and improved volume benefits provided herein. For reasons not fully understood, the pieces do not expand but quite suddenly dry and brown.

Importantly, the present high intensity microwave exposure step is to be distinguished from heating of the edible foam in a conventional microwave oven. A conventional microwave oven is characterized by a relatively low field intensity, i.e., about 10 to 20 V/cm. Microwave field intensity can be described, of course, in various ways. In the present invention, the microwave field intensity is described in a conventional manner as a voltage gradient in free space, e.g., volts per centimeter ("V/cm"). For comparison, the field strength of the present invention is about three to ten or more times greater than achieved in a conventional consumer microwave oven. Such high microwave field intensity can in turn involve high energy dissipation (>100 w/g) in the product. In contrast, in a conventional microwave oven, as the unit's rated power increases, generally the unit's cavity size also increases so that the field strength remains relatively constant. This power density feature is important not only so that the operating/cooking performance remains relatively uniform regardless of cavity size but also to prevent premature burn-out of the magnetron by reverse channeling or microwave reflection through the wave guide.

In the present invention, the cereal base pieces are desirably subjected to a microwave density field ranging greater than 110 V/cm or between about three to ten times (3×–10×") conventional microwave field intensity, preferably 125 to 350 V/cm, more preferably 150 to 300 V/cm. Also, it is preferred to use higher microwave frequencies. Thus, between the two licensed microwave frequencies permitted at present, a 2450 MHz frequency is highly preferred to 915 MHz. Higher frequencies importantly give more uniformity in field strength which in turn can result in greater uniformity in the finished product.

Measurement and/or calculation of field strength can be troublesome. Useful to measure such high intensity microwave field strength herein is a Microwave E-Field Probe or meter (Model No. MEF-1.5) available from Luxtron Corp. (Mountain View, Calif.).

Microwave equipment that can provide the desired field strength is commercially available. Useful herein for practicing the present methods are industrially sized microwave ovens from Cober Electronics, Inc. and, preferably APV Baker, Inc. (For a good description, see GB 2,193,619A by R. J. Meredith and John Milton.) Minor modifications to the equipment may be required to adapt the equipment from a known application, e.g., rubber curing, to the sanitary standards that are conventional for food processing.

The particular exposure times will vary depending upon such factors as the moisture content, equipment capacity starting temperature, degree of toasting preferred, the microwave performance characteristics of the equipment selected including the microwave field characteristics it develops, the microwave absorbing characteristics of the edible foam, the quantity of pieces being processed at any time, the starting and ending moisture contents, piece thickness and composition, etc. However, good results generally are obtained when the edible foam pieces are exposed for times ranging from about 5 to 70 seconds. Better results in terms of finished volume and texture are obtained when exposure times range from about 10 to 40 seconds. For best results, exposure times desirably range from about 10 to 30 seconds. Generally, longer exposure times are selected when greater volume is desired or with high moisture content foams and/or cooled foams are used. These values are for the actual exposure to the microwave energy. In the examples, run times specified involve 37% thereof as exposure to the microwave heating.

In the preferred embodiment, the wet foam can be provided in the form of discrete pieces that are microwave heat set rather than providing a mass that is treated and then subsequently formed into individual pieces.

C. Low Temperature Finish Drying

The present methods further comprise the step of finish drying the high intensity microwave heat set foam to desired low moisture contents.

It is desirable that the finish drying be practiced at low temperatures or such other mild conditions to minimize the exposure of the flavor constituents to degradation. Preferred for use herein is drying, e.g., convection (forced hot air) at temperatures of <150° F. Vacuum drying can also be used. While vacuum drying provides a higher quality product in terms of flavor, vacuum drying is more expensive than other useful drying techniques.

The drying step is continued for times sufficient to achieve the desired moisture contents of the finished products herein.

The present finished compositions have moisture contents ranging from about 0.5% to 7%. Preferred compositions of the present invention have moisture contents of less than about 6%, and most preferably less than 2%. Such low-moisture content levels insure that the water activity ("$A_w$") of the present invention is less than about 0.4 and thus are stable against microbial growth when stored for extended periods. Also, such low water activity minimizes water migration from the pieces to R-T-E cereals which can adversely affect the crisp texture of the R-T-E cereal.

The preferred pieces so prepared are generally spherical or cone shaped and range in size from about 8 to 12 mm in diameter, although both larger and smaller pieces can also be prepared. Generally, larger pieces are preferred due to the greater degree of uniformity of the interior portion of the finished foam product. Additionally, larger pieces tend to have higher volumes/lower densities which in turn provides the finished product pieces with a desirable light and airy texture.

The edible puffed pieces prepared by the present invention can be used in various ways. For example, the pieces can be consumed by themselves as a snack item or in combination with other items, e.g., granola, nuts, etc. As indicated above, the present edible foam pieces find particular suitability for use as an added ingredient in R-T-E cereals. Even more preferred embodiments are those which additionally match the density of puffed R-T-E cereals, i.e., pieces of the present invention having preferred densities of about 0.15 to 0.25 g/cc.

The present dried edible pieces have a remarkable extended storage stability while maintaining their desirable texture, color and appearance.

The R-T-E cereals with which the present edible products can be combined include all R-T-E cereal particles whether or not presweetened and flaked, shredded, expanded, or in other forms, such as wheat flakes, corn flakes, shredded wheat, puffed wheat, rice, oat, or corn, bran flakes, whole bran cereal. Such cereal products are prepared in conventional manner and may be either toasted or untoasted. The edible foam pieces herein can comprise from about 1% to 50% of the blended cereal products, preferably about 5% to 20%.

While the present invention is generally directed towards preparation of free standing finished foam pieces useful as added ingredients to R-T-E cereals, surprisingly the present methods can also be used when the edible foam is mounted upon or within a high intensity microwave tolerant substrate. Substrates can include both inedible materials, e.g., packaging or support layers, as well as edible substrates. For example, the edible foam can be mounted upon or cover the R-T-E cereal base. Suitable R-T-E cereal bases include finished unpuffed R-T-E cereal pieces, finished puffed R-T-E cereal pieces, and partially puffed or puffable R-T-E cereal pieces or pellets. In still another variation, the finished pieces comprise a single discrete piece of the cereal base, e.g., a puffed cereal base with the foam surrounding the cereal base core. In another variation, the foam can surround a plurality of cereal base pieces, e.g., smaller sized cereal base pieces.

While in certain embodiments the fruit foam can comprise the exterior phase of these composite edible foam/cereal base pieces, in other embodiments the edible foam can comprise an inter phase constituting a core surrounded by an edible cereal based shell. In these embodiments wherein the foam constitutes an interior phase, an advantage of the present invention is that upon microwave heating to heat set the edible foam, the foam (especially those embodiments including dried egg white as the heat setting ingredient) tend to expand to completely fill the interior void or cavity within the exterior shell. In those embodiments in which the cereal base substrate is only partially puffed or puffable, the high intensity microwave heating step can be extended to supply additional energy to accomplish puffing or finish puffing of the cereal base in addition to the heat setting of the edible foam.

In one embodiment of the present invention, products are realized which are particularly suitable for addition to prepackaged ready-to-eat cereals. In this embodiment, the aerated confections are generally characterized by specific gravities preferably between about 0.2 and 0.5. Specific gravities within this range ensure that the products are both highly buoyant and highly frangible. As such highly buoyant, frangible and sweet compositions, they have strong appeal to children.

The present invention is illustrated by the following examples:

Example 1

A strawberry flavored edible foam product of the present invention was prepared having the following formulation:

| Ingredient | Weight % | Dry Weight % |
|---|---|---|
| Strawberry puree concentrate (28 Brix) | 59.21 | 30.10 |
| Glucose (dextrose) | 14.81 | 24.60 |
| Sucrose | 14.81 | 26.90 |
| Corn starch | 6.50 | 10.70 |
| Egg albumen | 2.40 | 4.00 |
| Pregelatinized corn starch | 1.20 | 2.00 |
| Triglycerol monostearate | 0.60 | 1.10 |
| Flavor | 0.35 | 0.60 |
| Color | 0.12 | 0.00 |
| | 100.00 | 100.00 |

The wet product was mixed cold and whipped to a density of 0.5 g/ml. The sample was deposited on parchment paper, microwaved using 9 kW (150–200 V/cm) of energy for about 55 seconds to heat set the foam. The heating was continued until the foam expanded due to moisture evolution. The entire run time is 55 seconds, however, only 37% of this time involves direct exposure to the microwave energy field. This also applies to all further examples.

The foam was finish dried in a convection oven at 140° F. for about 13 hours.

The final moisture content was about 2%. The water activity was about 0.25. The finished foam had a density of about 0.25 g/cc.

Example 2

A peach flavored edible foam product of the present invention was prepared having the following formulation:

| Ingredient | Weight % | Dry Weight % |
|---|---|---|
| Peach puree concentrate (32 Brix) | 43.4 | 25.1 |
| Pear puree concentrate (38 Brix) | 21.5 | 14.8 |
| Glucose (dextrose) | 12.9 | 21.3 |
| Sucrose | 12.9 | 23.3 |
| Corn starch | 6.4 | 10.5 |
| Egg albumen | 1.9 | 3.2 |
| Triglycerol monostearate | 0.6 | 1.1 |
| Flavor | 0.4 | 0.7 |
| | 100.0 | 100.0 |

This product was mixed cold and whipped to a density of 0.5 g/ml. The sample was deposited on parchment paper, microwaved using 9 kW (150–200 V/cm) of energy for 55 seconds and finish dried.

The finish drying was finished dried in a convection oven at 140° F. for about 13 hours.

The final moisture content was about 2%. The water activity was about 0.25. The finished foam had a density of about 0.3 g/cc.

Example 3

A banana flavored edible foam product of the present invention was prepared having the following formulation:

| Ingredient | Weight % | Dry Weight % |
|---|---|---|
| Banana puree concentrate (23 Brix) | 65.3 | 31.4 |
| Glucose (dextrose) | 12.9 | 24.7 |
| Sucrose | 12.9 | 26.9 |
| Corn starch | 6.4 | 12.1 |
| Egg albumen | 1.9 | 3.7 |
| Triglycerol monostearate | 0.6 | 1.3 |
| | 100.0 | 100.0 |

This product was mixed cold and whipped to a density of 0.5 g/ml. The sample was deposited on parchment paper, microwaved using 10.5 kW (200 V/cm) of energy for 55 seconds and finish dried.

The finish drying was in a convection oven at 140° F. for about 13 hours.

The final moisture content was about 2%. The water activity was about 0.25. The finished foam had a density of about 0.3 g/cc.

Example 4

An apple flavored edible foam product of the present invention was prepared having the following formulation:

| Ingredient | Weight % | Dry Weight % |
|---|---|---|
| Apple juice concentrate (70 Brix) | 29.9 | 37.4 |
| Water (180° F.) | 32.8 | 0.0 |
| Pectin | 0.9 | 1.5 |
| Sucrose | 12.65 | 22.6 |
| Glucose (dextrose) | 12.65 | 20.7 |
| Corn starch | 5.5 | 8.9 |
| Egg albumen | 2.1 | 3.4 |
| Pregelatinized waxy maize corn starch | 3.0 | 4.7 |
| Triglycerol monostearate | 0.5 | 0.9 |
| | 100.0 | 100.0 |

Pectin and sucrose were mixed first and dissolved in hot water (180° F.). The rest of the ingredients were added and whipped to a density of 0.4 g/ml. When deposited on parchment paper, the sample was microwaved using 10.5 kW (200 V/cm) of energy for 55 seconds and finish dried. The finish drying was in a convection oven at 140° F. for about 13 hours.

The final moisture content was about 2%. The water activity was about 0.25 and 0.20 g/cc.

In another variation, the wet foam was topically applied to form an exterior phase to a dried finished puffed cereal having a generally square and planar form. Specifically, the foam was used as a frosting on Golden Grahams TM finished R-T-E cereal, the sample was microwaved using 6 kW (110 V/cm) of energy for 64 seconds and finish dried.

Example 5

A peanut butter (binder formula) flavored edible foam product of the present invention was prepared having the following formulation:

| Ingredient | Weight % | Dry Weight % |
|---|---|---|
| Peanut butter | 30.9 | 42.7 |
| Glucose (dextrose) | 15.4 | 19.8 |
| Sucrose | 15.4 | 21.6 |
| Water (hot) | 26.1 | 0.0 |
| Ethoxylated mono | 0.5 | 0.7 |
| Corn starch | 4.1 | 5.2 |
| Pregelatinized corn starch | 1.5 | 2.0 |
| Egg albumen | 4.6 | 5.9 |
| Triglycerol monostearate | 1.5 | 2.1 |
| | 100.0 | 100.0 |

This formula was used to bind cereal pieces or particulates (i.e., chocolate chips, nuts, etc.) together. The mixture was then microwaved using 6 kW (110 V/cm) of energy for 45 seconds and finish dried. The finish drying was finished dried in a convection oven at 140° F. for about 13 hours. The final moisture content was about 2%. The water activity was less than 0.2.

Example 6

A peanut butter (puffing formula) flavored edible foam product of the present invention was prepared having the following formulation:

| Ingredient | Weight % | Dry Weight % |
|---|---|---|
| Peanut butter | 33.5 | 46.7 |
| Water (hot) | 26.8 | 0.0 |
| Glucose | 14.0 | 18.1 |
| Sucrose | 14.0 | 19.8 |
| Corn starch | 4.5 | 5.8 |
| Pregelatinized corn starch | 2.3 | 3.0 |
| Egg albumen | 3.9 | 5.1 |
| Triglycerol monostearate | 1.1 | 1.6 |
| | 100.0 | 100.0 |

This formula puffed well on parchment paper but was especially useful as a filling. The sample was deposited inside a cereal rope (Golden Grahams). The filled rope was sectioned into 2 g pieces. Both the cereal and filling were puffed on the microwave using 9 kW (150–200 V/cm) of energy for 54 seconds. The sample was then finish dried. The finish drying was finished dried in a convection oven at 140° F. for about 13 hours. The final moisture content was about 2.5%. The water activity was about 0.20. The interior foam completely filled the center of the composite puffed cereal/edible foam pieces.

Example 7

A chocolate flavored edible foam product of the present invention was prepared having the following formulation:

| Ingredient | Weight % | Dry Weight % |
|---|---|---|
| Chocolate chips | 29.8 | 42.1 |
| Dextrose | 14.0 | 18.6 |
| Sucrose | 14.0 | 20.4 |
| Corn starch | 4.5 | 5.9 |
| Pregelatinized waxy maize starch | 1.7 | 2.2 |
| Pregelatinized corn starch | 2.8 | 3.8 |
| Ethoxylated monoglycerides | 0.6 | 0.9 |
| Triglycerol monostearate | 1.1 | 1.6 |
| Egg albumen | 3.4 | 4.6 |
| Water | 28.1 | 0.0 |
| | 100.0 | 100.0 |

This product was mixed cold and whipped to a density of 0.5 g/ml. The sample was deposited on parchment paper, microwaved using 10.5 kW (200 V/cm) of energy for 55 seconds and finish dried.

The finish drying was in a convection oven at 140° F. for about 13 hours.

The final moisture content was about 2.5%. The water activity was about 0.3. The finished foam had a density of about 0.3 g/cc.

Example 8

A yogurt flavored edible foam product of the present invention was prepared having the following formulation:

| Ingredient | Weight % | Dry Weight % |
|---|---|---|
| Yogurt | 81.3 | 37.2 |
| Corn starch | 7.3 | 24.3 |
| Pregelatinized waxy maize starch | 3.3 | 10.5 |
| Pregelatinized corn starch | 1.6 | 5.5 |
| Triglycerol monostearate | 1.6 | 5.9 |
| Egg albumen | 4.9 | 16.5 |
| | 100.0 | 100.0 |

The ingredients were combined, warmed to 90° F., and whipped to a density of 1.0 g/ml. The mixture was deposited on parchment paper as 0.7 g pieces and microwaved using 12 kW (200–250 V/cm) of energy for 34 seconds and dried at 140° F. in a convection oven until crisp.

The heat set foam was finished dried in a convection oven at 140° F. for about 13 hours.

The final moisture content was about 2%. The water activity was about 0.25. The finished foam had a density of about 0.3 g/cc.

Example 9

An orange and cream flavored edible foam product of the present invention was prepared having the following formulation:

| Ingredient | Weight % | Dry Weight% |
|---|---|---|
| Cream powder | 15.0 | 29.9 |
| Orange concentrate | 18.9 | 12.7 |
| Water | 37.7 | 0 |

-continued

| Ingredient | Weight % | Dry Weight% |
|---|---|---|
| Sucrose | 15.1 | 31.7 |
| Emulsifier (a hard monoglyceride co-spray dried with nonfat dry milk) | 1.9 | 4.0 |
| Triglycerol monostearate | 0.8 | 1.7 |
| Egg albumen | 2.6 | 5.0 |
| Corn starch | 5.7 | 10.9 |
| Pregelatinized waxy maize corn starch | 2.3 | 4.2 |
|  | 100.0 | 100.00 |

The cream powder, orange concentrate and water were homogenized first. Then the dry ingredients were added and the final mixture was whipped in a Hobart mixer. The mixture was deposited on parchment paper and microwaved using 9 kW (150–200 V/cm) of energy for 64 seconds and dried at 140° F. in a convection oven until crisp.

The finish drying was finished dried in a convection oven at 140° F. for about 13 hours.

The final moisture content was about 2%. The water activity was about 0.25. The finished foam had a density of about 0.3 g/cc.

Example 10

A peaches and cream flavored edible foam product of the present invention was prepared having the following formulation:

| Ingredient | Weight % | Dry Weight % |
|---|---|---|
| Peach concentrate | 48.5 | 24.1 |
| Cream powder | 12.1 | 17.8 |
| Glucose | 14.5 | 20.7 |
| Sucrose | 14.5 | 22.5 |
| Corn starch | 7.2 | 10.1 |
| Triglycerol monostearate | 0.7 | 1.1 |
| Egg albumen | 2.1 | 3.0 |
| Peach flavor | 0.4 | 0.6 |
|  | 100.0 | 100.0 |

The mixture was combined and run through an Oakes aerating machine. (The settings were rotator 60% and pump 35%). This helped mix the ingredients thoroughly. Then the mixture was whipped in a Hobart mixer, deposited on parchment paper and microwaved using 10.5 kW (200 V/cm) of energy for 62 seconds and dried at 140° F. in a convection oven until crisp.

The finish drying was in a convection oven at 140° F. for about 13 hours.

The final moisture content was about 2%. The water activity was about 0.25. The finished foam had a density of about 0.2 g/cc.

Example 11

A cheese flavored edible foam product of the present invention was prepared having the following formulation:

| Ingredient | Weight % | Dry Weight % |
|---|---|---|
| Velveeta processed cheese (shredded) | 50.1 | 65.7 |
| Ethoxylated monoglyceride | 0.7 | 1.8 |
| Corn starch | 5.7 | 13.5 |
| Pregelatinized waxy maize starch | 2.2 | 5.0 |

-continued

| Ingredient | Weight % | Dry Weight % |
|---|---|---|
| Emulsifier | 0.9 | 2.4 |
| Triglycerol monostearate | 1.1 | 2.9 |
| Egg albumen | 3.6 | 8.7 |
| Water | 35.7 | 0.0 |
|  | 100.0 | 100.0 |

The water was heated to 180° F. The shredded Velveeta cheese was added to the hot water and mixed to form an homogeneous paste. The remaining dries were added and the mixture was whipped on a Hobart mixer. The mixer was deposited on parchment paper and microwaved using 9 kW (150–200 V/cm) of energy for 57 seconds and dried at 140° F. in a convection oven until crisp.

The foam was finished dried in a convection oven at 140° F. for about 13 hours.

The final moisture content was about 2%. The water activity was about 0.25. The finished foam had a density of about 0.2 g/cc.

What is claimed is:

1. A food foam product comprising:
   A. about 5% to 70% by weight (dry basis) of the foam product of a flavor characterizing ingredient;
   B. sufficient amounts of an undenatured proteinaceous whipping agent sufficient to provide the foam product to a density of 0.1 to 0.6 g/cc (dry weight basis) having a heat setting temperature;
   C. about 0% to 55% by weight (dry basis) of the product of a nutritive carbohydrate sweetening agent; and
   D. about 0.5% to 7% by weight moisture.

2. The food foam product of claim 1, additionally comprising:
   E. about 0.5% to 1.5% of a foaming emulsifier, and wherein the flavor characterizing ingredient is selected from the group consisting of fruit puree solids, milk ingredient(s), milk ingredient solids, cocoa, chocolate, and peanut butter.

3. The food foam product of claim 2 wherein the foam product has a water activity ranging from about 0.1 to 0.4.

4. The food foam product of claim 3 additionally comprising about 5% to 65% by weight of the foam product of a starch material selected from the group consisting of starches, dextrans, flours, and mixtures thereof.

5. The food foam product of claim 4 wherein the foam product comprises about 0.1% to 15% dextrose, and wherein the food foam product has a specific gravity ranging from about 0.2 to 0.5.

6. The food foam product of claim 5 wherein the flavor characterizing ingredient includes a deseeded fruit puree(s), and wherein the foaming emulsifier is triglycerol monostearate.

7. The food foam product of claim 3 additionally comprising and disposed within an exterior shell fabricated from a dried cooked cereal dough.

8. The food foam product of claim 4 wherein the nutritive carbohydrate sweetening agent comprises about 10% to 25% of the foam product.

9. The food foam product of claim 8 wherein the density ranges from about 0.15 to 0.35 g/cc, and wherein the product is free of interior voids.

* * * * *